Dec. 24, 1929.      D. NEWTON ET AL      1,741,034
FISHING TACKLE
Filed Feb. 15, 1928
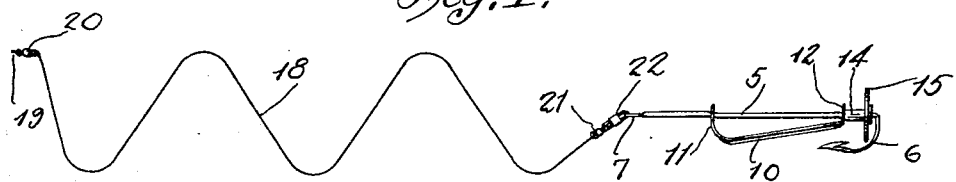
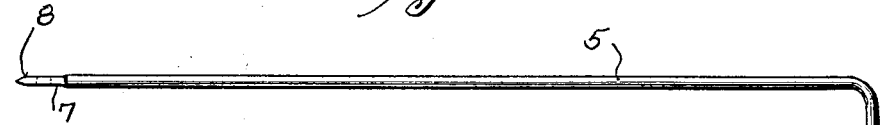
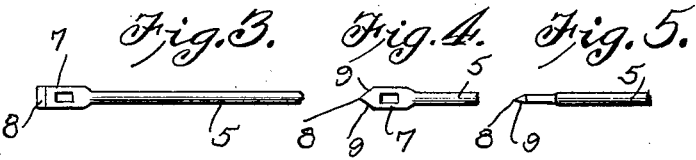
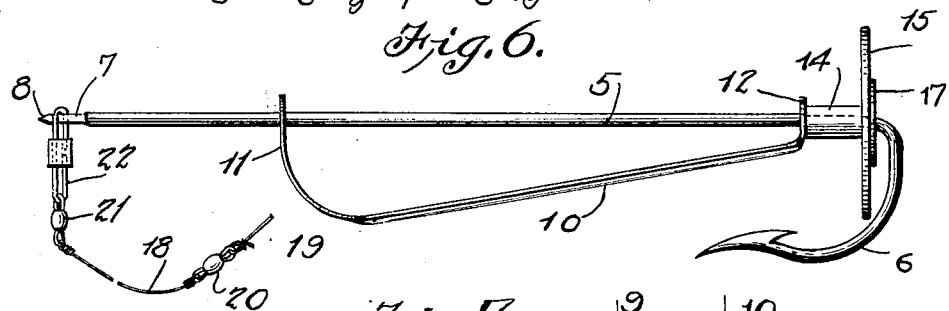
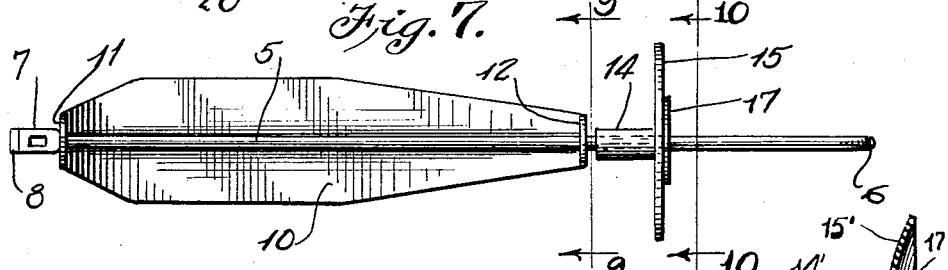
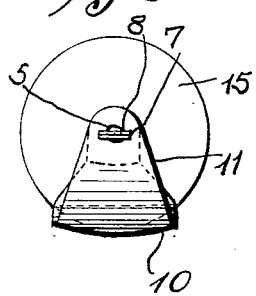
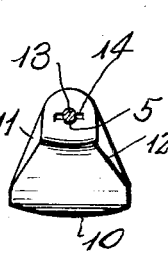
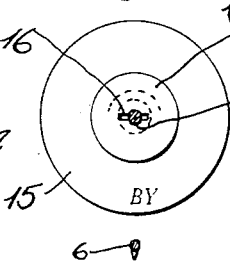
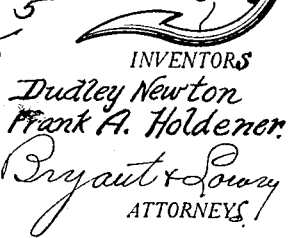
INVENTORS
Dudley Newton
Frank A. Holdener
Bryant & Lowry
ATTORNEYS Patented Dec. 24, 1929

1,741,034

UNITED STATES PATENT OFFICE

DUDLEY NEWTON AND FRANK A. HOLDENER, OF SACRAMENTO, CALIFORNIA

FISHING TACKLE

Application filed February 15, 1928. Serial No. 254,481.

This invention relates to certain new and useful improvements in fishing tackle, and has for one of its principal objects the provision of a fishing tackle embodying a fish hook having a suction disk or plate at the rear or hook end thereof, and a spring leader at the front end thereof that will yield or stretch and allow the hook to be sucked into an attacking fish's mouth, and that will then contract when the suction is relieved for causing the hook to effectively snag the fish.

A more specific object of the present invention is to provide, in fishing tackle, a fish hook embodying a shank having a hook member at one end and adapted for connection at its other end to a leader or fishing line, said other end of the shank being formed and sharpened to facilitate positioning of either a lure or bait upon the shank, as desired, the shank being sufficiently long to permit the bait to be properly impaled thereon.

A still further object is to provide improved fishing tackle of the character specified above, wherein a lure is slidably mounted upon the shank of the hook and is caused to undergo a darting motion thereon in opposite directions as the leader is placed under tension and the tension subsequently relieved, to thereby most effectively attract fish to the hook.

Still another object is to provide fishing tackle of the above character in which the suction plate or disk is carried at the rear end of the lure for causing the plate and the hook to be sucked into an attacking fish's mouth.

Other objects are to provide means for the ready removal of the lure and suction plate when it is desired to use bait upon the shank of the hook instead, and to provide fishing tackle of the above kind which is extremely simple in construction and inexpensive to manufacture.

The invention consists in the novel form, combination and arrangement of parts hereinafter more fully described, shown in the accompanying drawing and claimed.

In the drawing:—

Figure 1 is an elevational view of fishing tackle embodying the present invention;

Figure 2 is an enlarged side elevational view of the fish hook forming part of the tackle shown in Figure 1;

Figure 3 is a fragmentary plan view showing the attaching end portion of the shank of the hook shown in Figure 2;

Figure 4 is a view similar to Figure 3 showing a slightly modified form of attaching end portion for the hook shank;

Figure 5 is an edge elevational view of the device shown in Figure 4;

Figure 6 is an enlarged fragmentary side elevational view of the tackle shown in Figure 1;

Figure 7 is a top plan view of the device shown in Figure 6;

Figure 8 is an end elevational view looking toward the right of Figure 7;

Figure 9 is a transverse section taken on line 9—9 of Figure 7;

Figure 10 is a transverse section taken on line 10—10 of Figure 7; and

Figure 11 is a fragmentary view, partly in side elevation and partly in section showing a modified form of suction disk and adjacent parts.

Referring more in detail to the drawing, the present fishing tackle embodies a fish hook including a relatively long straight shank or shaft 5 formed at one end with a hook member 6 of conventional form, and having its other end flattened and provided with an opening to form an eye 7 for facilitating connection of the fish hook to a leader or fishing line, the free end of the shank at the terminal of the eye 7 being sharpened as at 8 for facilitating impaling of a small fish or other bait upon the shank 5. In other words, this sharpened end may be readily passed through the bait so as to effect impaling of the bait on the shank 5. As shown in Figure 3, the free end of the eye 7 may be sharpened in knife form, while as shown in Figures 4 and 5, it may be pointed by beveling opposite side edges as at 9.

As shown, a lure 10 is removably mounted on the shank 5 of the hook and is capable of lateral pivotal and longitudinal sliding movement thereon. This lure is shown as composed of a forwardly inclined body portion and upturned ends 11 and 12 formed from a single strip of metal and tapered at the ends to simulate to a certain extent the appearance of a small fish, the upturned ends 11 and 12 having alined openings as at 13 to pivotally and slidably receive the shank 5, and said openings 13 centrally intersecting transverse elongated slots 14 through which the flattened eye 7 may pass in removing or applying the lure from or to the shank 5.

Slidably mounted upon the shank 5 rearwardly of the lure 10 is a sleeve 14 carrying a plate or disk 15 at its rear end, the plate 15 being preferably formed of reinforced rubber or other flexible material and being sufficiently small as to pass within the space between the rear end of the shank 5 and the hook member 6 as shown in Figures 1 and 6. The sleeve 14 and disk 15 are provided with central openings to receive the shank 5 and to permit the free passage of the eye member 7 therethrough, as indicated at 16, whereby the sleeve 14 and its plate 15 may be removed when desired. The plate or disk 15 may be attached to the sleeve 14 in any desired manner, but is shown as being secured to and abutting the forward side of an end flange 17 provided on the rear end of the sleeve 14.

The present device also includes a yieldable or spring leader 18, preferably consisting of a length of resilient wire or the like normally tensioned to assume the wavy or serpentine form of Figure 1. This leader 18 is adapted to be interposed between the fishing line 19 and the fish hook shank 5 as shown in Figures 1 to 6, swivels 20 and 21 being provided at the opposite ends of the leader 18 for respective connection with the line 19 and the shank eye 7. The connection of the swivel 21 with the eye 7 of the shank 5 is effected by some quick detachable connecting device 22 or a snap hook so that the leader 18 may be readily unfastened from the hook whenever it is desired to remove the lure and the suction plate 15, or to re-bait the fish hook. The swivels 20 and 21 permit freedom of movement between the several elements so that proper action thereof is insured and entangling of the elements is rendered highly unlikely.

When in use, the fishing tackle is dragged through the water, the lure, when impaled upon the shank of the fish hook, oscillating from side to side, and the suction plate 15 and the lure sliding to the rear end of the shank 5 as shown in Figures 1 and 6. As the resistance to the movement of the device through the water varies from time to time, the leader 18 is alternately placed under tension and the tension thereon relieved so as to cause the lure 10 to dart back and forth on the shank 5 and thereby attract fish to the hook. An attacking fish, opening his mouth behind the suction plate 15 and sucking the water into his mouth, causes the suction plate 15 to be drawn or moved rearwardly so as to carry the hook member 6 into the fish's mouth, the leader 18 yielding to permit this action. When the fish then closes his mouth, the suction is relieved and the leader 18 contracts to its normal position so as to pull the hook member 6 forwardly and effectively snag the fish.

From the foregoing description it will be seen that we have provided a simple and efficient form of fishing tackle having the numerous features and advantages pointed out above.

Minor changes may be made without departing from the spirit and scope of the invention as claimed.

In Figure 11, the disk 15' is formed of a piece of flexible rubber and has a concavo-spherical shape, being snugly fitted on the sleeve 14' and positioned in front of the flange 17' formed on the rear end of said sleeve.

What we claim as new is:—

1. In combination, a fish hook embodying a shank having a hook member at one end, and a suction plate on the hook end of said shank.

2. In combination, a fish hook embodying a shank having a hook member at one end, and a suction plate slidably mounted on said shank.

3. In fishing tackle, a yieldable leader for fish hooks or lures comprising a length of resilient metal normally tensioned and assuming a wavy serpentine form.

In testimony whereof we affix our signatures.

DUDLEY NEWTON.
FRANK A. HOLDENER.